Nov. 29, 1955     T. M. McKEE     2,725,484
APPARATUS FOR DETECTING PENETRATIVE RADIATION
Filed Dec. 5, 1951

INVENTOR.
THERESA M. McKEE
BY
ATTORNEYS 2,725,484
Patented Nov. 29, 1955

2,725,484

APPARATUS FOR DETECTING PENETRATIVE RADIATION

Theresa M. McKee, New York, N. Y., assignor to Texaco Development Corporation, New York, N. Y., a corporation of Delaware Application December 5, 1951, Serial No. 259,951

4 Claims. (Cl. 250—71)

This invention relates to the detection and measurement of penetrative radiation such as gamma rays, and more particularly to luminophor elements for use in the detection and measurement of such penetrative radiation and for similar purposes.

Certain substances such as naphthalene, zinc sulfide, silicates, and calcium tungstate have been found to possess the property of converting penetrative rays such as gamma rays to radiation in other ranges of the spectrum such as the ultraviolet range and visible light range. Stated otherwise, such substances have been found to possess the property of converting radiation of relatively short wave lengths to radiation of longer wave lengths. Such substances have been termed luminophors and their utilization in the detection of such penetrative radiation has been practiced to some extent.

This invention pertains to a luminophor which has the feature of being both dense and capable of transmitting radiation of longer wave lengths such as visible radiation, ultraviolet radiation, etc.; which radiation will hereinafter be termed "light." This feature is attained by providing in combination a plurality of laminae which are capable of transmitting such light and having deposited on each of them a thin coating of a luminophor. This coating is of such a form and quantity as to permit passage of substantially all the light incident on, or originating from within it. The laminae bearing the luminophor are advantageously arranged so that light originating or passing through one element will pass through the plane of elements adjoining it.

When a luminophor is used to detect penetrative radiation it is desirable that the luminophor be a dense material, and also that it transmits the radiation emitted as a consequence of the interaction of the luminophor with the penetrative radiation. The denser the luminophor is, that is, the more atoms it contains per unit volume which can react with the penetrative radiation, the more likely will it be that the penetrative radiation will interact with any one of the atoms. If the luminophor is not transparent to the radiation which is emitted, it is obvious that very little of the radiation emitted will be able to reach and cross through the surface of the luminophor in order to be available to any device provided to receive the emitted radiation.

Most of the crystalline inorganic luminophors used at the present time have a high physical yield of light, i. e., the fraction of penetrative radiation absorbed by the luminophor and transformed into light is high. But many of these inorganic luminophors have a low potential yield; the amount of the light produced in the luminophor which is accessible to a light-receiving device outside the luminophor is low since these inorganic luminophors are opaque in varying degrees to their own light.

If a luminophor is used in the form of a powder rather than in the form of a single crystal the problem of obtaining the light emitted by the luminophor may be made more difficult. A powder consists of a great number of very small crystals, and the number of crystal surfaces present in a powder is increased greatly over the number of surfaces present in a crystal having an equivalent weight. Thus in a powder the amount of light internally reflected and scattered within the luminophor substance is much greater than that in an equivalent single crystal.

Thus the use of films of luminophor powder does not obviate the difficulty of absorption of light that is present in a large crystal of the luminophor, for although the internal absorption of light is less in a powder, the internal reflection is greater than in a crystal. If the single crystals of luminophors could be sliced into thin layers the difficulties presented by the use of powders or crystals would be lessened in that the internal absorption would be less than that present in a crystal and the internal reflection would be less than that in a powder. But at the present time it has been difficult, if not impossible to prepare such slices of luminophor.

Many organic luminophors, both in the solid and liquid form, have the advantage of presenting a high potential yield of the light emitted within them as a consequence of their interaction with penetrative radiation. But most of these organic luminophors have the disadvantage of presenting a low physical yield of light; the fraction of penetrative radiation absorbed by the luminophor and transformed into light is small.

In overcoming the aforesaid disadvantages, and in providing an improved luminophor element, one of the features of the invention is provision of an improved luminophor element having suitable density requirements while at the same time being able to substantially transmit light which has originated from without or within the luminophor element. Stated conversely, the invention provides a luminophor element having suitable light transmitting requirements while at the same time having a density which provides for the efficient detection of penetrative radiation incident upon, and interacting with, the luminophor.

Another feature of the invention is the provision of a luminophor element which has low internal reflection of light, but does not have high absorption of light.

Another advantage of the invention is the provision of a novel luminophor element which is adaptable to various uses with high efficiency.

Figure 1:
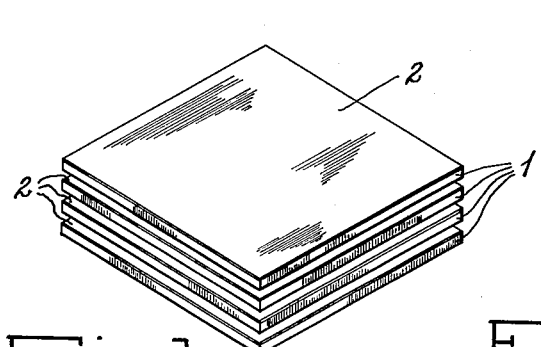
Figure 1 illustrates a luminophor element in the form of a plurality of layers or laminations.

Referring to Figure 1, the numeral 1 designates thin rectangular layers or sheets of glass, quartz or other solid substance capable of transmitting light. For example, a glass manufactured under the trademark Corex is useful for this purpose. Although four layers or sheets are shown, the element may comprise any number of such layers or sheets. The numeral 2 designates a coating of luminophor material, such as zinc sulfide, deposited upon the surface of each layer or sheet. The deposit is advantageously in the form of a substantially continuous thin film, although, as previously indicated, it may be in discontinuous or speckled form. The film may be of molecular or micro-molecular thickness. Moreover, the luminophor substance may be deposited on either or both the upper and lower surfaces of each layer 1, and, in addition, may be applied to one or more of the edges of each layer 1.

As indicated in Figure 1, each layer may be contiguous or substantially contiguous and may even be spaced apart from its adjacent layer a short distance, for example, 5 to 10 microns. It will be understood that the laminations or layers need not be rectangular or square in form but may be circular, elliptical, triangular or of any desired shape.

Figure 2:
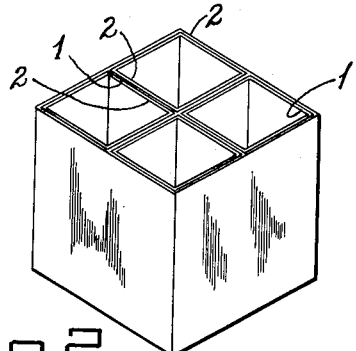
Figure 2 illustrates an element having a honeycomb type of structure.
Figure 3:
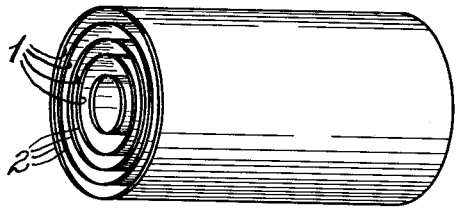
Figures 3 and 4 illustrate other structural forms.
Figure 4:
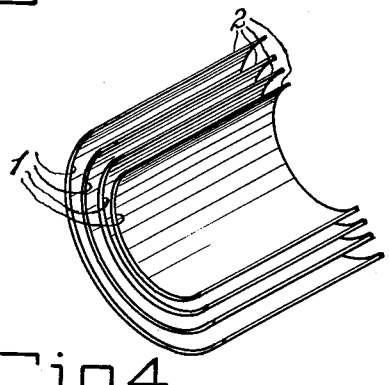

Figures 2, 3 and 4 disclose modifications of the invention. In Figure 2 a plurality of the light transmitting surfaces as described in the explanation of Figure 1, are arranged to form a plurality of parallelopipeds, providing a honeycomb type of structure. Figure 2 is a diagrammatic illustration of such arrangement. With an arrangement such as this the incidence upon it of a penetrative radiation would necessarily result in interaction between the penetrative radiation and the luminophor. Although the angle at which the luminophor surfaces cut each other is shown to be 90°, any angle between 0° and 90° could have been shown.

Figure 3 is a diagrammatic view of a series of concentric cylindrical surfaces such as described in the explanation of Figure 1.

Figure 4 is a similar depiction of a series of semi-cylindrical luminophor surfaces arranged to form a trough or channel type structure. Although not illustrated the structure may comprise a plurality of concentric hemispherical laminae to provide a cup-shaped element.

Figure 5:
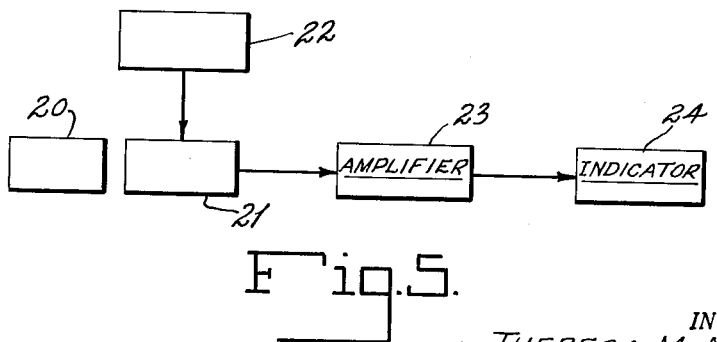
Figure 5 illustrates an arrangement of apparatus, including the novel luminophor element, useful for detecting penetrative radiation.

Referring to Figure 5, the numeral 20 designates a luminophor element such as previously illustrated in Figure 1, coupled in light conductive relationship with a photoelectric device 21 capable of converting light variations into electric variations. A power supply 22 is provided for energizing the device 21. The output from the device 22 is fed into an amplifier 23, which in turn is connected to a suitable indicator or register 24.

In operation, the detecting portion of the device is placed adjacent a source of penetrative radiation which strikes the luminophor element 20. The interaction between the penetrative radiation and the luminophor material in the element 20 results in the production of light rays which in turn strike the photoelectric device 21 and are thereby converted into electrical variations. For example, if the photoelectric device 21 comprises a photo-multiplier tube, the light rays are converted into electrical pulses or signals which are passed to the amplifier 23, the resulting amplified signals being fed into the indicator or register 24 and are thus indicative of the energy of the penetrative radiation which is being investigated.

Many other modifications of the invention could be described including one in which the luminophor surfaces are arranged in a completely haphazard manner in relation to one another. Among the obvious modifications is the arrangement wherein a unit as depicted in Figure 1 is placed adjacent to another such unit in such a manner that the constituent luminophor surfaces of either group would not be parallel to one another. The luminophor element as described herein may also be formed in other shapes depending upon the particular requirements of the geometry needed to detect the penetrative radiation.

As an example of a further useful modification, the means which receive the light emitted from the novel luminophor element described herein and transform the light energy into another form of energy can be conveniently situated within the luminophor element so that this light-receiving means could "see" the entire luminophor element. This may be done with simple light coupling means and without resorting to special devices to protect the luminophor element from the light-receiving means.

Obviously many modifications and variations of the invention as above set forth may be made without departing from the spirit and scope thereof, and therefore, only such limitations should be imposed as are indicated in the appended claims.

In the following claims the term penetrative radiation is intended to refer to atomic and nuclear radiation of all types such as ultraviolet radiation, gamma radiation, neutrons, electrons, alpha particles, protons and cosmic rays.

I claim:

1. A luminophor element for detecting penetrative radiation comprising a unitary structure consisting of a plurality of juxtaposed laminae, each lamina including a light-transparent member carrying on at least one of its surfaces a film of a normally opaque luminophor substance of substantially mono-molecular thickness, whereby said substance is rendered light-transparent, the number of said laminae being sufficient, for radiation passing therethrough in succession, to afford absorption of a substantial portion of the radiation.

2. An element as in claim 1 where said normally opaque substance is inorganic.

3. An element as in claim 1 in which said laminae are in the form of substantially flat sheets and are juxtaposed in parallel relationship.

4. An element as in claim 1 in which said laminae comprise cylindrical surface configurations which in the juxtaposition thereof are in substantially coaxial relationship to each other.

References Cited in the file of this patent

UNITED STATES PATENTS

| | | |
|---|---|---|
| 2,272,375 | Kallmann et al. | Feb. 10, 1942 |
| 2,351,028 | Fearon | June 13, 1944 |
| 2,559,219 | Ludeman | July 3, 1951 |

OTHER REFERENCES

The Scintillation Counter—Coltman Proceedings of the I. R. E., vol. 37, #6, June 1949, pp. 671, 682.

Naphthalene Counters for Beta and Gamma Rays, Deutsch, Nucleonics, March, 1948.

Scintillation Counters, Wouters, AECD 2203, pp. 1–9, Aug. 5, 1948.